United States Patent
Gumina

(10) Patent No.: US 10,056,173 B2
(45) Date of Patent: Aug. 21, 2018

(54) APPARATUS FOR EXTRUDING A COATING AROUND AN ELECTRIC CONDUCTOR

(71) Applicant: SAMP S.p.A. CON UNICO SOCIO, Bentivoglio (IT)

(72) Inventor: Antonio Gumina, Bentivoglio (IT)

(73) Assignee: SAMP S.P.A. CON UNICO SOCIO, Bentivoglio (IT)

( * ) Notice: Subject to any disclaimer, the term of this patent is extended or adjusted under 35 U.S.C. 154(b) by 0 days.

(21) Appl. No.: 14/435,958

(22) PCT Filed: Oct. 17, 2013

(86) PCT No.: PCT/IB2013/059432
§ 371 (c)(1),
(2) Date: Apr. 15, 2015

(87) PCT Pub. No.: WO2014/060992
PCT Pub. Date: Apr. 24, 2014

(65) Prior Publication Data
US 2015/0332814 A1    Nov. 19, 2015

(30) Foreign Application Priority Data

Oct. 17, 2012    (IT) .............................. BO2012A0567

(51) Int. Cl.
*H01B 13/14*    (2006.01)
*B05C 3/12*    (2006.01)
(Continued)

(52) U.S. Cl.
CPC ............ *H01B 13/141* (2013.01); *B05C 3/12* (2013.01); *B05C 11/1036* (2013.01);
(Continued)

(58) Field of Classification Search
CPC ...... B29C 47/74; B29C 47/56; B05C 11/1036
See application file for complete search history.

(56) References Cited

U.S. PATENT DOCUMENTS 3,733,156 A  *  5/1973  Garner ................ B29C 44/0461
                                                    425/129.1
3,752,617 A  *  8/1973  Burlis ................. B29C 47/0052
                                                    138/118

(Continued)

FOREIGN PATENT DOCUMENTS

AT            000989 U1    8/1996
DE            12222656     8/1966
(Continued)

OTHER PUBLICATIONS

International Search Report, PCT/IB2013/059432, dated Apr. 2, 2014.

*Primary Examiner* — Karl Kurple
(74) *Attorney, Agent, or Firm* — Matthew A. Pequignot; Pequignot + Myers

(57) ABSTRACT

Apparatus for the production of an electric conductor provided with at least a layer of coating plastic material. The apparatus comprises: a head for the extrusion of an electric conductor; at least a main extruder having a first supply duct; at least an auxiliary extruder having a second supply duct; and a device for the selection and the diversion of the flows of coating plastic material. The selection and diversion device is provided, in turn, with at least a device for the exclusion of the auxiliary extruder; with a bypass duct between the first duct and the second duct; and with a flow-regulating diverter valve arranged in the intersection point between the first supply duct and a bypass duct connecting the first duct to the second duct.

5 Claims, 6 Drawing Sheets

(51) Int. Cl.
  *B05C 11/10* (2006.01)
  *B29C 47/56* (2006.01)
  *B29C 47/02* (2006.01)
  *B29C 47/74* (2006.01)
  *B29C 47/08* (2006.01)
  *B29C 47/04* (2006.01)
  *B29C 47/28* (2006.01)

(52) U.S. Cl.
  CPC ............ *B29C 47/025* (2013.01); *B29C 47/56* (2013.01); *B29C 47/74* (2013.01); *B29C 47/043* (2013.01); *B29C 47/0816* (2013.01); *B29C 47/0874* (2013.01); *B29C 47/28* (2013.01); *B29C 2947/926* (2013.01)

(56) References Cited

U.S. PATENT DOCUMENTS

| | | | | |
|---|---|---|---|---|
| 3,918,865 | A * | 11/1975 | Nissel | B29C 47/0021 264/173.12 |
| 4,124,308 | A * | 11/1978 | Sokolow | B29C 44/0492 264/328.12 |
| 4,164,956 | A * | 8/1979 | Takahashi | B29B 7/801 137/242 |
| 4,182,601 | A * | 1/1980 | Hill | B29C 47/043 264/171.19 |
| 4,746,281 | A * | 5/1988 | Laugs | H01B 13/323 425/113 |
| 4,761,129 | A | 8/1988 | Aste | |
| 4,784,819 | A * | 11/1988 | Spurr | B29C 45/2758 264/328.19 |
| 4,816,308 | A * | 3/1989 | Shimizu | B32B 27/08 215/12.2 |
| 4,832,960 | A | 5/1989 | Compagnon | |
| 4,925,161 | A * | 5/1990 | Allan | B29C 45/0005 264/108 |
| 4,973,239 | A * | 11/1990 | Herrmann | B29C 45/46 264/328.1 |
| 5,019,439 | A * | 5/1991 | Momose | B29C 47/0021 264/173.13 |
| 5,074,772 | A * | 12/1991 | Gutjahr | B29C 45/0082 264/328.13 |
| 5,102,323 | A * | 4/1992 | Blemberg | B29C 47/56 264/176.1 |
| 5,282,731 | A * | 2/1994 | Dinter | B29C 47/0004 425/131.1 |
| 5,542,937 | A * | 8/1996 | Chee | A61M 25/0009 604/264 |
| 5,980,098 | A * | 11/1999 | Meier-Kaiser | B29C 47/1063 366/76.3 |
| 6,634,878 | B1 * | 10/2003 | Yanagawa | B29C 47/0016 425/113 |
| 7,229,584 | B2 * | 6/2007 | Brix | B29C 45/1808 264/328.18 |
| 8,177,542 | B2 * | 5/2012 | Groff | A21C 11/163 425/131.1 |
| 2008/0272513 | A1 * | 11/2008 | Stenzel | B29C 47/062 264/173.17 |
| 2009/0085243 | A1 * | 4/2009 | Taylor | B29C 47/0023 264/173.12 |
| 2012/0111426 | A1 * | 5/2012 | Trakas | B01D 29/33 137/511 |
| 2015/0283750 | A1 * | 10/2015 | Kenny | B29C 47/28 264/171.24 |

FOREIGN PATENT DOCUMENTS

| | | |
|---|---|---|
| JP | S59 54535 A | 3/1984 |
| JP | H05111949 | 5/1993 |
| JP | 2003 071906 A | 3/2003 |
| JP | 2005 219362 A | 8/2005 |
| WO | WO 2006/000843 A1 | 1/2006 |

* cited by examiner

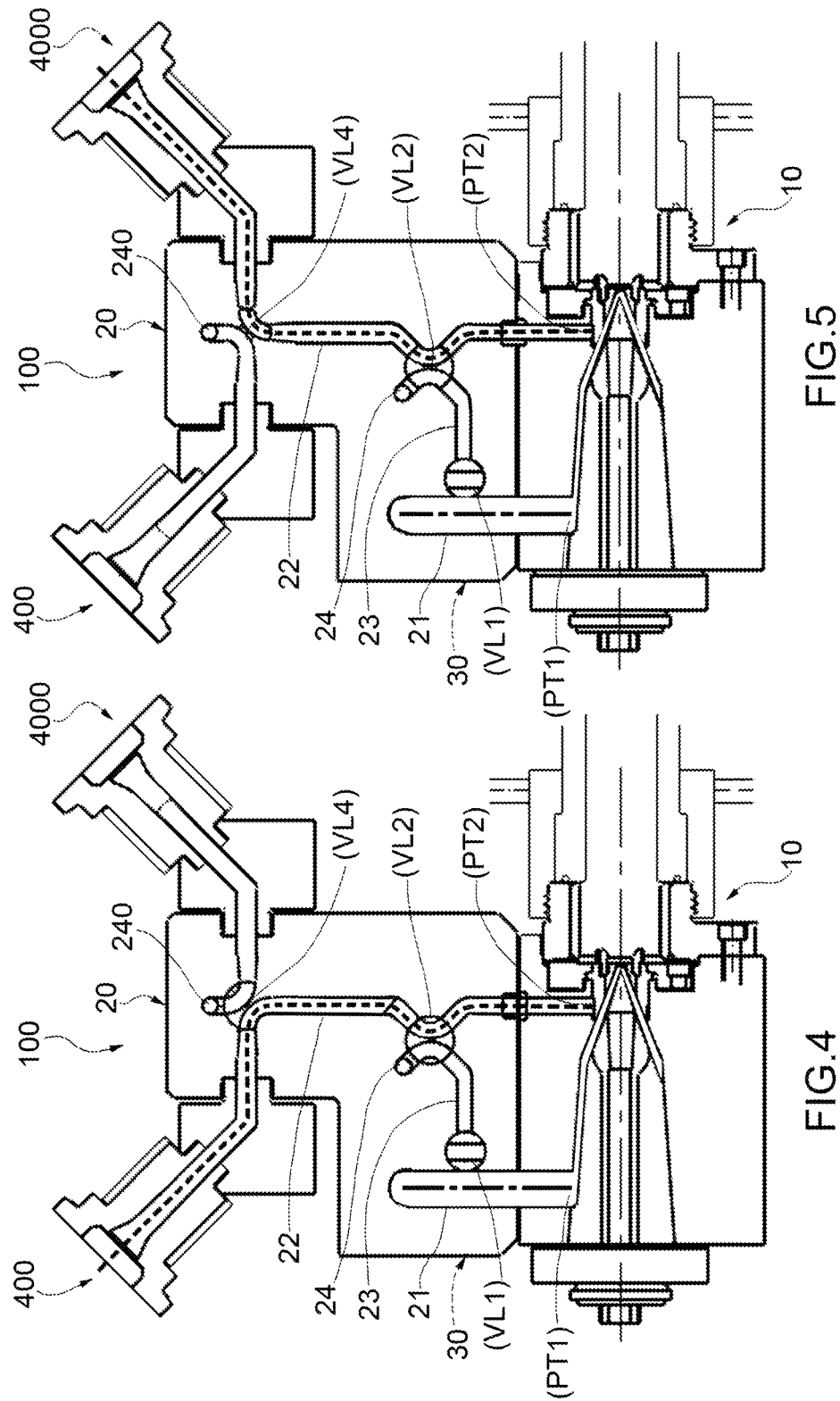

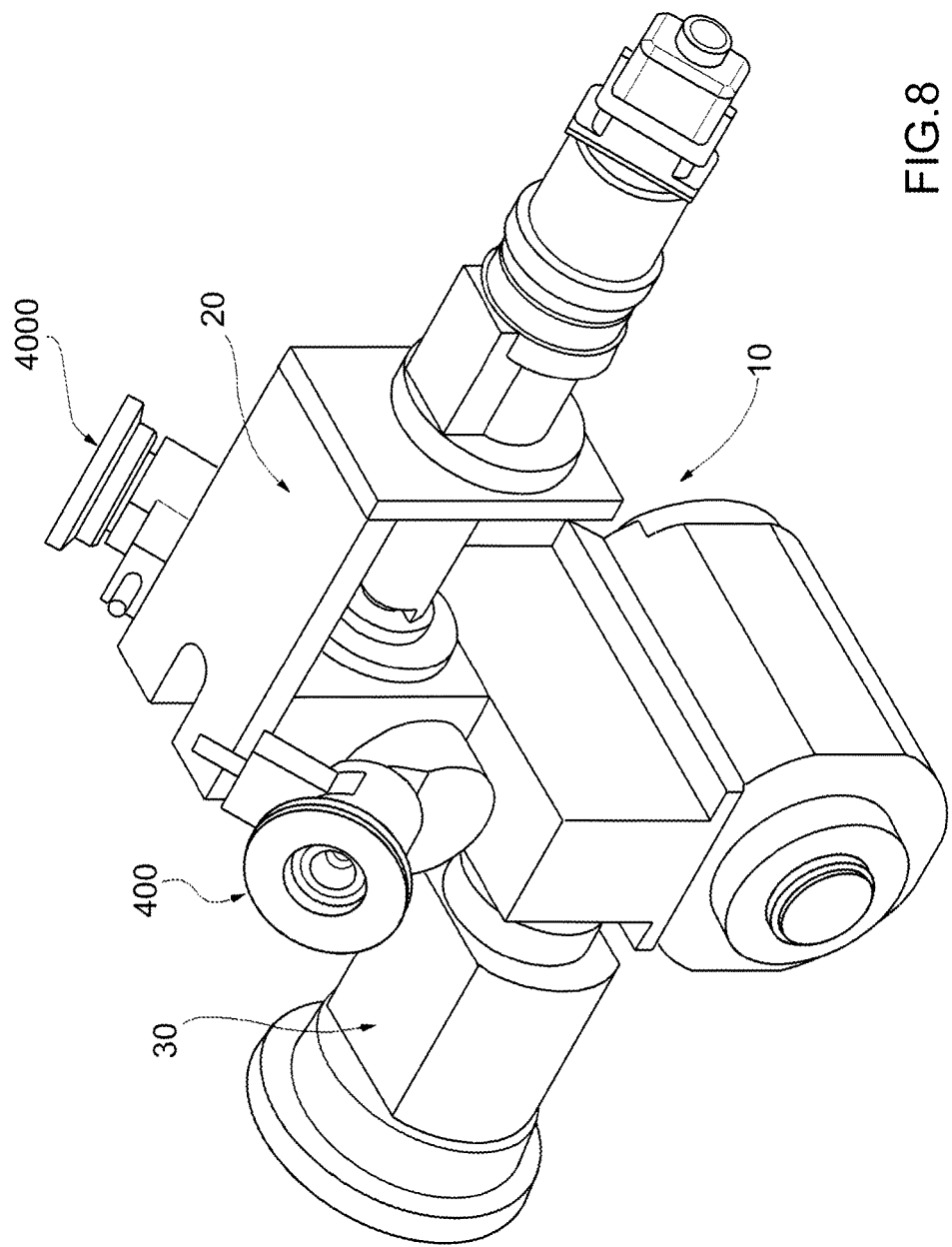

APPARATUS FOR EXTRUDING A COATING AROUND AN ELECTRIC CONDUCTOR

RELATED APPLICATION DATA

This application is the national stage entry of International Appl. No. PCT/IB2013/059432, filed Oct. 17, 2013, which claims priority to Italian Patent Application No. BO2012A000567, filed Oct. 17, 2012. All claims of priority to these applications are hereby made, and each of these applications is hereby incorporated in its entirety by reference.

TECHNICAL FIELD

The present invention concerns an apparatus for the production of an electric conductor provided with at least a layer of a coating plastic material.

BACKGROUND ART

In particular, and without losing a general character, the present description refers to an apparatus for coating an electric conductor by means of an extrusion process, with a sheath having at least two layers or stripes of different or differently coloured materials.

Apparatuses of this kind contain at least two extruders for plastic materials, each of them being connected to a respective supply duct for each respective plastic material. Moreover, at least two plastic material exhaust ducts are provided, which can be selectively connected to the aforesaid supply ducts by means of a distributing device.

In traditional systems, plastic materials in a fluid/rubbery state pass only through the half of the number of supply ducts, namely an extruder is assigned to each series of channels, whereas the other half of the ducts is in a non operative state, namely they are extruders connected to the extrusion head but not in use.

This originates a relevant technical problem, namely that in non active ducts, therefore in auxiliary extruders which are not in use, some plastic material remains which in time hardens and/or deteriorates, thus obstructing or polluting the plastic material moving from the main extruder.

Therefore, the machine must be frequently stopped to clean the obstructed ducts and to replace the closure or distribution ring of the head any time a layer of plastic material must be removed and/or added, or if the auxiliary extruder must be excluded. This obviously involves a remarkable loss of time and of finished product.

DISCLOSURE OF INVENTION

Accordingly, the main aim of the present invention is to avoid the aforesaid drawback and to provide for an apparatus of the aforesaid kind, wherein the machine does not need to be stopped for being cleaned and for changing the distribution rings after having changed colour and/or material and/or during the passage from the "dual layer/triple layer" mode to the "single layer" mode and/or vice versa (see further on).

The presently adopted processes for manufacturing a "dual layer" wire require at least a working main extruder and a working auxiliary extruder.

According to the present invention, therefore, it is manufactured an apparatus for the production of an isolated electric conductor provided with several layers of differently coloured insulating materials, according to what claimed in Claim 1, or in any one of the Claims directly or indirectly dependent on Claim 1.

BRIEF DESCRIPTION OF THE DRAWINGS

For a better understanding of the present invention there will be now described two preferred embodiments, purely as non limiting examples, and with a reference to the enclosed drawings, wherein:

FIG. 4 shows a second embodiment of an apparatus object of the present invention, wherein some selection devices take a first configuration;

FIG. 5 shows the same apparatus of FIG. 4, wherein the same selection devices take a second configuration;

FIG. 8 shows a 3D overall view of the apparatus shown in FIGS. 4-7.

Figure 1:
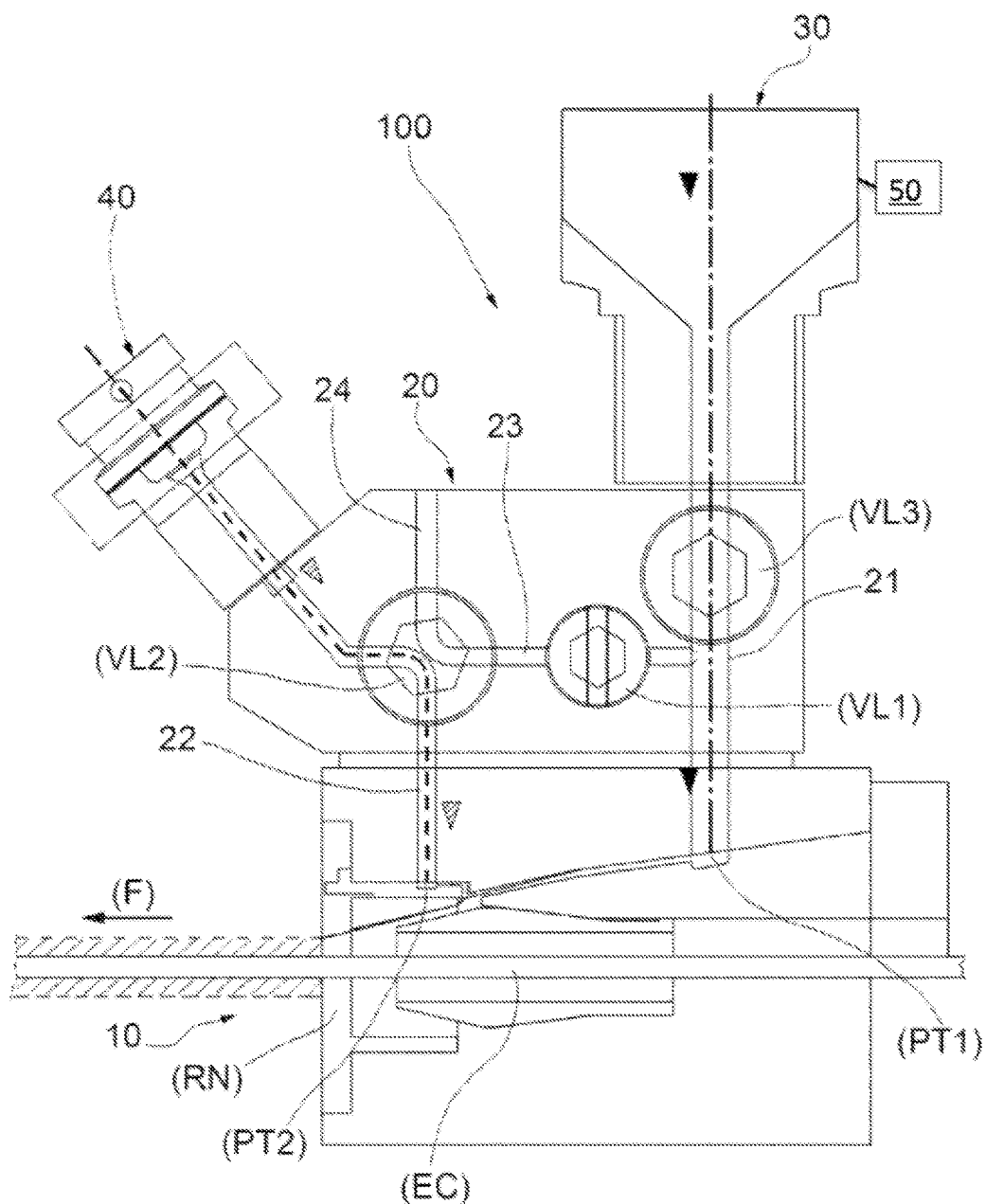
FIG. 1 shows a first embodiment of an apparatus object of the present invention, wherein some selection devices take a first configuration.

All configurations are reversible.

BEST MODE FOR CARRYING OUT THE INVENTION

In the enclosed figures, reference number 100 indicates as a whole a first embodiment of an apparatus for the production of an isolated electric conductor provided with layers of differently coloured insulating materials manufactured according to the teaching of the present invention.

The apparatus 100 comprises, first of all, a head 10 for extruding an electric conductor (EC) (passing according to a direction and orientation given by an arrow (F)) and for coating said electric conductor (EC) with at least a layer of insulating plastic material (see below).

The extrusion head 10 is of a known type and will not be described in more detail.

As already known, the electric conductor (EC) (usually made of copper, aluminium, etc.) is extruded aside, upstream of the apparatus 100.

Therefore, the extrusion head 10 serves only as a guide of the electric conductor (EC) and as a device for coating the same electric conductor (EC) with one or more layers of at least a plastic material.

A device 20 for the selection and the diversion of the flows of coating plastic material is fixed to the extrusion head 10 by known means.

The end part of a main extruder 30 of a first coating plastic material, and the end part of an auxiliary extruder 40 of a second coating plastic material, and of a possible second auxiliary extruder for a "triple layer" mode, are connected to the selection and diversion device 20.

As shown in the enclosed figures, the selection and diversion device 20 is provided with:

a first duct 21 for feeding the first coating plastic material from the main extruder 30 to the extrusion head 10; the first plastic material is injected on the electric conductor (EC) passing through a point (PT1) of the extrusion head 10;

a second duct 22 for feeding the second coating plastic material from the auxiliary extruder 40 to the extrusion head 10; the second plastic material is injected on the layer of first material in a point (PT2) (or under the first layer, if necessary) of the extrusion head 10 downstream of the aforesaid point (PT1); and a bypass duct 23 connecting the first duct 21 to the second duct 22.

Moreover, in the particular embodiment shown in the enclosed figures, there is a first flow-regulating diverter valve (VL1) arranged at the beginning of the bypass duct 23, and a second diverter valve (VL2) arranged at the end of the bypass duct 23.

An exhaust duct 24 originates from the diverter valve (VL2); through this duct, as better seen in the following explanation of the apparatus operation, both plastic materials can asynchronously flow.

In other words, the first flow-regulating diverter valve (VL1) is a one-way valve, a two-way valve or a progressive valve, a gate valve, etc. arranged at the beginning of the duct, or along the bypass duct 23, whereas the second diverter valve (VL2) is a valve arranged exactly in the connection point between the second duct 22, the bypass duct 23 and the exhaust duct 24.

A third diverter valve (VL3) can be arranged also in the first duct 21. Once closed, said valve isolates the main extruder 30 in order to allow its disassembly for maintenance use.

Incidentally, in the present case such a diverter valve (VL3) is always open.

All valves (VL1), (VL2), (VL3) can be manually operated by an operator, or pneumatic or hydraulic actuators can be applied, which are of known and not illustrated type.

As previously stated, FIG. 1 shows the apparatus 100 wherein the two diverter valves (VL1), (VL2) take a first configuration.

In this first configuration there is the formation of an insulating sheath by means of the first plastic material flowing through the main extruder 30 to the extrusion head 10, and a further coloured layer (called "skin" or "stripe", depending on its shape), adhering to the surface of the insulating sheath, made with the second plastic material coming from the auxiliary extruder 40 and fed to the extrusion head by means of the second duct 22.

Incidentally, in this particular technical field, a "skin" is a layer which is substantially cylindrical or has the desired shape depending on the shape of the hollow, evenly laid on the insulating sheath, whereas a "stripe" is a simple stripe of coloured material, also laid on the surface of the insulating sheath.

As already known, the passage from the "skin" condition to the "stripe" condition, or vice versa, or from "stripe/skin" to "single layer" can occur by simply replacing a ring (RN) placed in correspondence to the aforesaid point (PT2).

The configuration of FIG. 1 shows:
the first flow-regulating diverter valve (VL1) is closed, and therefore the first liquid cannot flow into the bypass duct 23, but flows only in the first duct 21; whereas
the second diverter valve (VL2) is arranged so that it allows the second plastic material to slide from the auxiliary extruder 40 to the extrusion head 10 using the second duct 22.

The second diverter valve (VL2) can advantageously be a ball valve.

At the end of the process carried out with the configuration of the selection and diversion device 20 shown in FIG. 1, therefore, a finished "dual layer" product is obtained.

In other words, the main extruder 30 lays an insulating coating layer (also called "sheath" or "insulation"), whereas the auxiliary extruder 40 just lays a colouring layer, or a layer made of a different material, thinner than the insulating layer.

Figure 2:
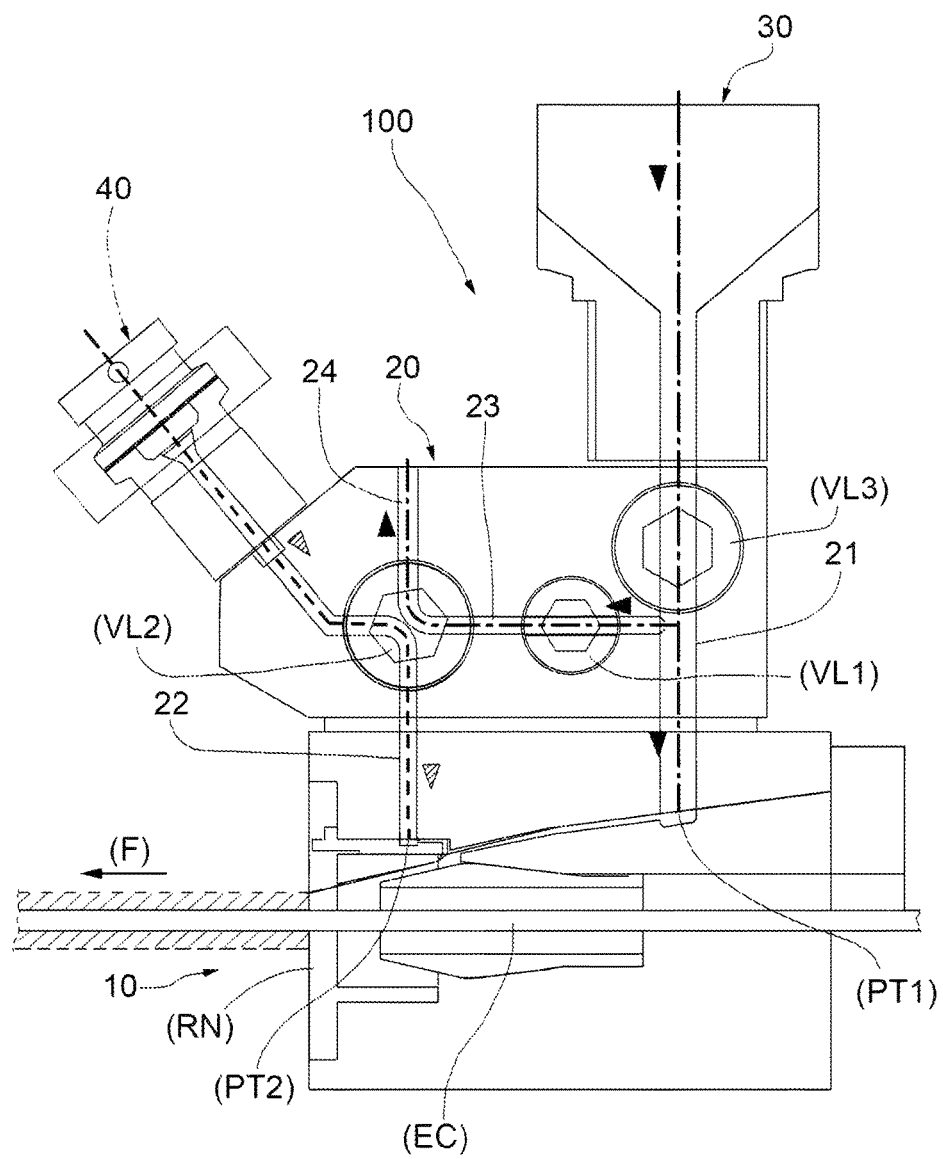
FIG. 2 shows the same apparatus of FIG. 1, wherein the same selection devices take a second configuration.

The configuration of FIG. 2 shows:
the first flow-regulating diverter valve (VL1) is at least partially open; whereas
the second diverter valve (VL2) is in the same position shown in FIG. 1.

Therefore, with the first diverter valve (VL1) at least partially open, the first plastic material coming out of the main extruder 30 is totally or partially evacuated through the exhaust duct 24, passing through the second diverter valve (VL2) as well.

Also in this case it is therefore obtained a final "dual layer" wire.

If a part of the first material is evacuated through the exhaust duct 24, in order to guarantee always the same thickness of insulating plastic material (thickness indicated by the regulations), the main extruder 30 must extrude more quickly, so that with a section of the duct 21 having the same size, there is a larger flow of first product which can compensate the loss of evacuated material.

The ability to accelerate the production rate of the main extruder 30 is given by means of an electronic control unit 50 (which can act, at least, as a means to accelerate) which controls the process. An acceleration of the production rate of the main extruder 30 also has the aim of accelerating the change of colour or of kind of plastic treated in the main extruder 30.

Figure 3:
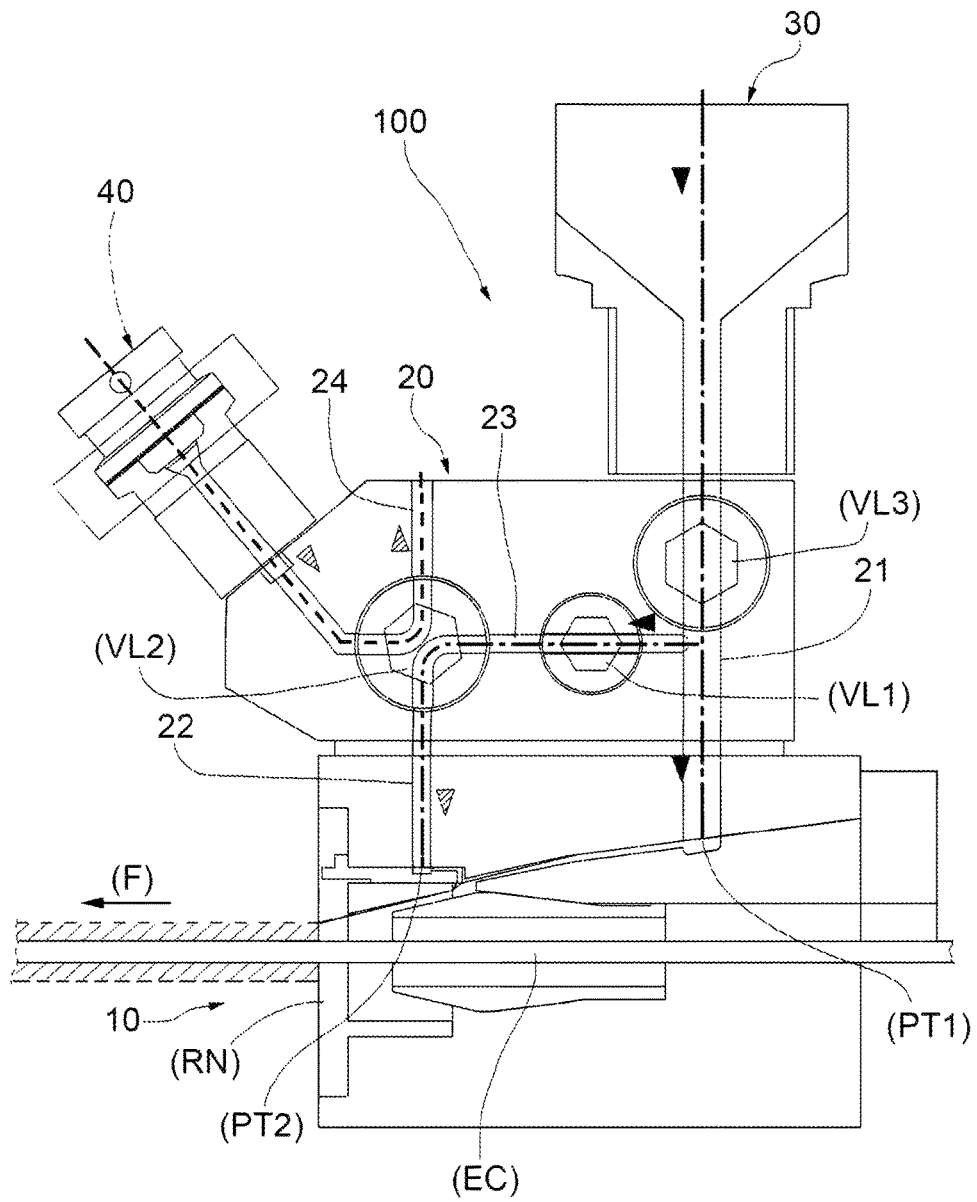
FIG. 3 shows the same apparatus of FIGS. 1, 2, wherein the same selection devices take a third configuration.

The configuration of FIG. 3 shows:
the first diverter valve (VL1) is completely open and flow-regulating;
by rotating the second diverter valve (VL2) of 180° or another defined angle, automatically and univocally the flow of the first plastic material coming from the main extruder 30 is partially diverted to the bypass duct 23 and to the second duct 22 to create a second layer on the sheath which, in turn, has been formed as usual by the plastic material coming out of the first duct 21.

In the third configuration shown in FIG. 3, the second plastic material is evacuated through the exhaust duct 24.

Therefore, in the configuration shown in FIG. 3, a "dual layer" mode (FIGS. 1, 2) becomes a "single layer" mode without the replacement of any component of the apparatus 100.

Moreover, in the configuration shown in FIG. 3, since the second plastic material is evacuated through the exhaust duct 24, the auxiliary extruder 40 can be stopped and/or disassembled for maintenance reasons without stopping the production which, as previously stated, has passed from "dual layer" mode (FIGS. 1, 2) to "single layer" mode (FIG. 3).

More precisely, a configuration shown in FIG. 3 can actually give a "dual layer" formed by two superimposed layers of the same material, both coming from the same main extruder 30.

The auxiliary extruder 40 can keep evacuating through the exhaust duct 24 for changing colour, material, etc. or can be stopped and disassembled by the selection and diversion device 20 without affecting the current production.

Therefore, one of the most relevant characteristics of the present invention is a "dual layer" coating carried out during the process, made of the same plastic material coming from the same extruder; these two superimposed layers having same colour, material and chemical and thermo-mechanical properties give a "single layer" final product with no remarkable differences if compared with the finished product.

In another embodiment of the present invention (not shown), the device for the selection and the diversion of the flows is provided with:
- at least a device for the exclusion of the auxiliary extruder (for example, similar to the valve (VL3));
- at least a bypass duct, or selective communication duct, between a first duct and a second duct; and
- diverter means arranged in the intersection point or in any other area between the first duct and the bypass duct.

The second embodiment shown in FIGS. 4-8 contemplates the use of two auxiliary extruders 400 and 4000. Between the exhaust ducts of the two auxiliary extruders 400, 4000 there is an exclusion valve (VL4) involving, in a known way, a related exhaust duct 240.

In the configuration shown in FIG. 4, the main extruder 30 and the first auxiliary extruder 400 work in "dual layer" mode.

In the configuration shown in FIG. 5, the main extruder 30 and the second auxiliary extruder 4000 work in "dual layer" mode.

Figure 6:
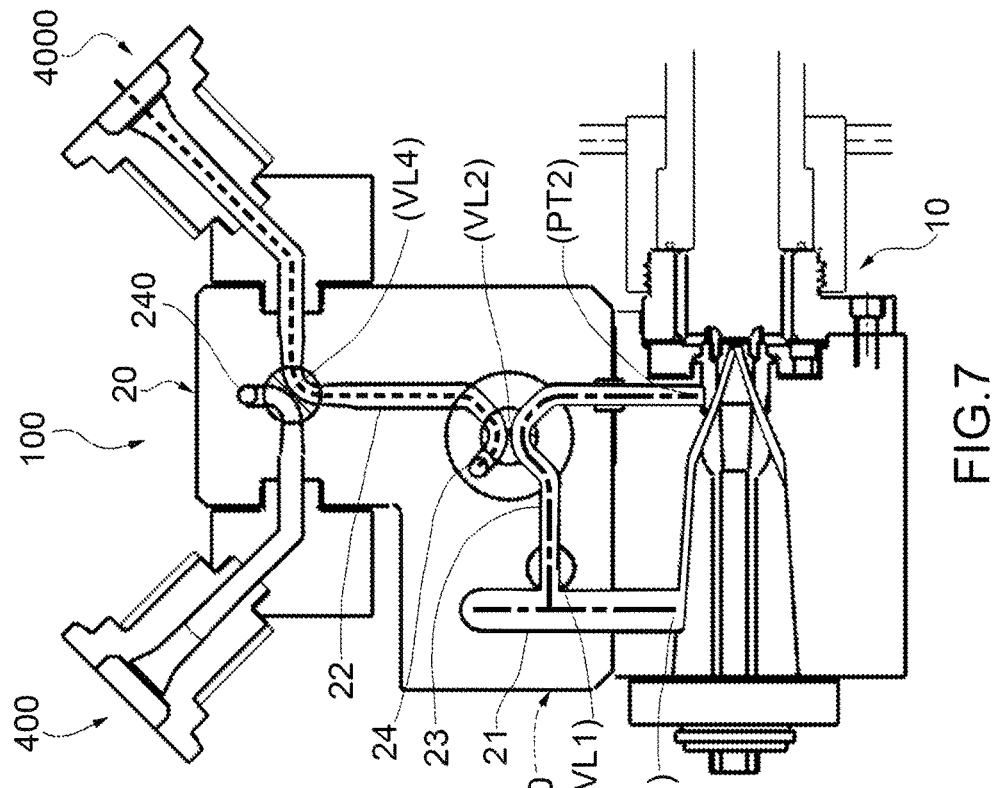
FIG. 6 shows the same apparatus of FIGS. 4, 5, wherein the same selection devices take a third configuration.

In the configuration shown in FIG. 6, only the main extruder 30 works in "single layer" mode.

Figure 7:
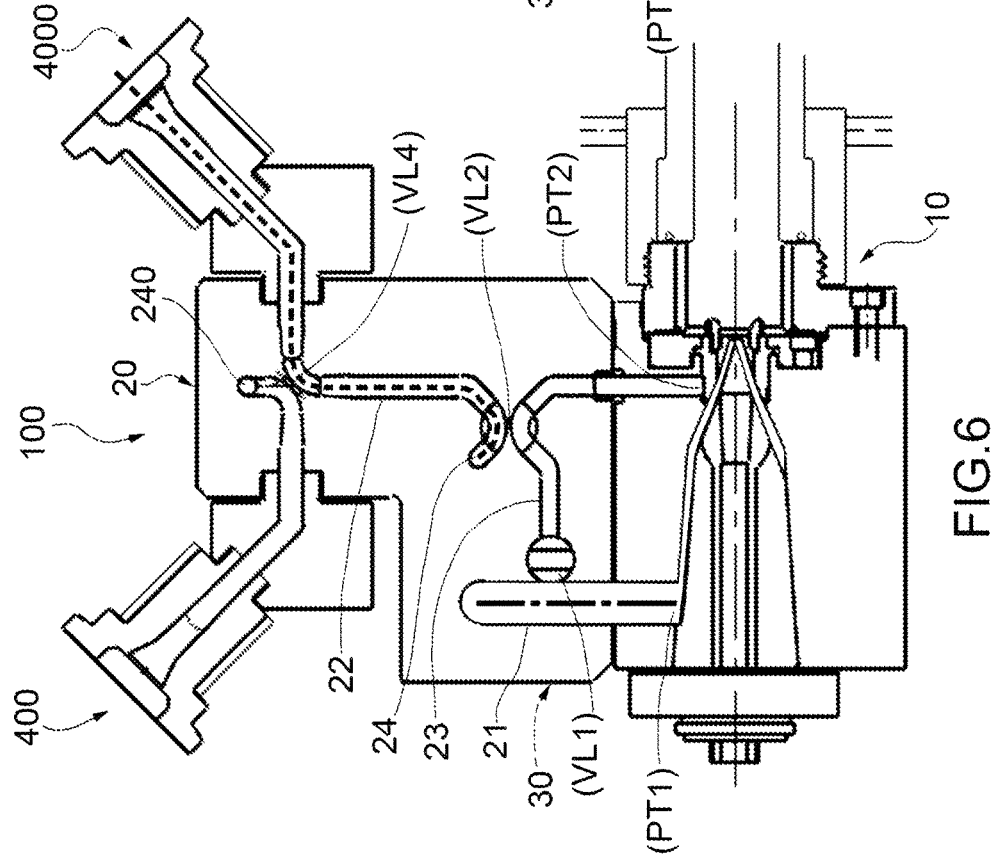
FIG. 7 shows the same apparatus of FIGS. 4, 5, 7, wherein the same selection devices take a fourth configuration.

In the configuration shown in FIG. 7, only the main extruder 30 works in "dual layer" mode, but laying two layers of the same material (as shown in FIG. 3 for the first embodiment).

The operation of the valves is clearly shown in the figures and therefore will not be explained in detail hereinafter.

Although the present description is mainly based upon an apparatus for coating an electric conductor (by means of an extrusion process, with a sheath having at least two layers or stripes of different materials, or different colours), it is clear that for the person skilled in the art, the teaching of the present invention can be easily applied to any process for coating a wire, of any kind, with at least a layer of plastic material. In particular, the wire can be metallic (e.g. copper), and/or the at least one layer of plastic material can be an electrically insulating plastic material.

The main advantage of the aforesaid apparatus consists in that it works in different operation modes ("single layer" using only the main extruder, or "dual layer" using both main and auxiliary extruder) without stopping the production line; in other words, the present apparatus allows a change of kind and/or material of the electric component insulation without stopping the production cycle and without replacing and cleaning the head inner components (such as, for instance, distribution rings or closure rings), using for example a single selection device mounted on a feeding block connected to the extrusion head.

The peculiarity of the present invention resides, ultimately, in the manufacture, placement and management of the flows of plastic material of the main extruder and of the auxiliary extruder, in order to use both of them at the same time, or only one at a time, without stopping the production process of the electric conductor, but only temporarily stopping the extruders not used.

Moreover, the process is perfectly reversible at any time (during the production or when the production line rests). The system avoids any stagnation of material in the ducts and facilitates the cleaning process of bypass/flow selectors and exhaust ducts.

The invention claimed is:
1. An apparatus (100) for the production of an electric conductor provided with at least a layer of coating plastic material; the apparatus (100) comprising:
- an extrusion head (10) including a guide through which passes an electric conductor (EC), said extrusion head (10) being configured for coating said electric conductor (EC) with at least the layer of coating plastic material;
- at least a main extruder (30) to which a first duct (21) for feeding a first coating plastic material to said extrusion head (10) is connectable; and
- at least an auxiliary extruder (40) to which a second duct (22) for feeding a second coating plastic material to said extrusion head (10) is connectable;
- said extrusion head (10) including a first plastic application point (PT1) and a second plastic application point (PT2), said second application point (PT2) being located downstream from said first application point (PT1), and both said first and said second application points (PT1 and PT2) being configured to apply coating plastic material to said electric conductor (EC);
- a device (20) being interposed between said extruders (30, 40) and said extrusion head (10) for a selection and a diversion of flows of coating plastic material; and
- at least a plastic material exhaust duct (24) for exhausting the first or second coating material from the device;
- the apparatus (100) being characterized in that said device (20) for the selection and the diversion of the flows is provided with:
- said first duct (21); said second duct (22); and said at least a plastic material exhaust duct (24);
- at least one means for excluding flow from said auxiliary extruder (40) to said second duct (22);
- at least a bypass duct (23) connected between said first duct (21) and said second duct (22), said bypass duct (23) being in selective flow communication with said first duct (21) and said second duct (22);
- a first flow-regulating means (VL1) arranged in an intersection point between said first duct (21) and said bypass duct (23); wherein said first flow-regulating means (VL1) enables bypass duct (23) to be in selective flow communication with said first duct (21) and said second duct (22); and
- a second flow-regulating means (VL2) arranged in an intersection point between said bypass duct (23) and said second duct (22),
- in a first configuration, said second flow-regulating means (VL2) is operably connected to said bypass duct (23) and said second duct (22), and said first flow-regulating means (VL1) is operably connected to said first duct (21) and said second duct (22), and said bypass duct (23); said first duct (21) being further connected to said main extruder (30); and wherein said apparatus is configured, in said first configuration, to deposit two layers of said first plastic material on said electric conductor (EC), one layer via said first duct (21) and one layer via said second duct (22), each of said two layers originating from same main extruder (30) and being applied simultaneously at said first and said second application points (PT1 and PT2), respectively; and
- in a second configuration, said second flow-regulating means (VL2) is operably connected to said bypass duct (23) and said second duct (22), and said first duct (21) is operably connected to said first flow-regulating means (VL1) being so configured and to said main extruder (30); said second duct (22) operably connected to said auxiliary extruder (40) and to said first duct (21), and wherein said apparatus is so configured, in said second configuration, to deposit one layer of said first coating plastic material on said electric conductor (EC) via said first duct (21) and one layer of said second coating plastic material on said electric conductor (EC) via said second duct (22), at said first and said second application points (PT1 and PT2) simultaneously, respectively.

2. The apparatus (100) according to claim 1, characterized in that said plastic material exhaust duct (24) is connected to said second flow-regulating means (VL2).

3. The apparatus (100) according to claim 1, characterized in that said device (20) for the selection and the diversion of the flows is further provided with at least a device (VL3) for the exclusion of flow from said main extruder (30) to said first duct (21).

4. The apparatus (100) according to claim 1, characterized in that said apparatus is provided with means to accelerate the production rate of said main extruder (30).

5. The apparatus (100) according to claim 1, characterized in that said at least an auxiliary extruder includes:
   two auxiliary extruders (400, 4000); and
   that said device (20) further includes an exclusion valve (VL4) and a second exhaust duct (240);
   said exclusion valve (VL4) being arranged between said two auxiliary extruders (400, 4000) and selectively connecting said two auxiliary extruders (400, 4000) to said second exhaust duct (240) and said second duct (22).

* * * * *